A. LEITCH.
Sap-Spout.

No. 48,961. Patented July 25, 1865.

Witnesses:
Theo. Tusch
Wm Trenwin

Inventor:
A. Leitch
By Munn
att.

UNITED STATES PATENT OFFICE.

ARCHIBALD LEITCH, OF RYEGATE, VERMONT.

IMPROVEMENT IN SAP-SPOUTS.

Specification forming part of Letters Patent No. 48,961, dated July 25, 1865.

*To all whom it may concern:*

Be it known that I, ARCHIBALD LEITCH, of Ryegate, in the county of Caledonia and State of Vermont, have invented a new and useful Improvement in Sap Spouts; and I do hereby declare that the following is a full, clear, and exact description thereof, which will enable others skilled in the art to make and use the same, reference being had to the accompanying drawings, forming part of this specification, in which—

Figure 1:
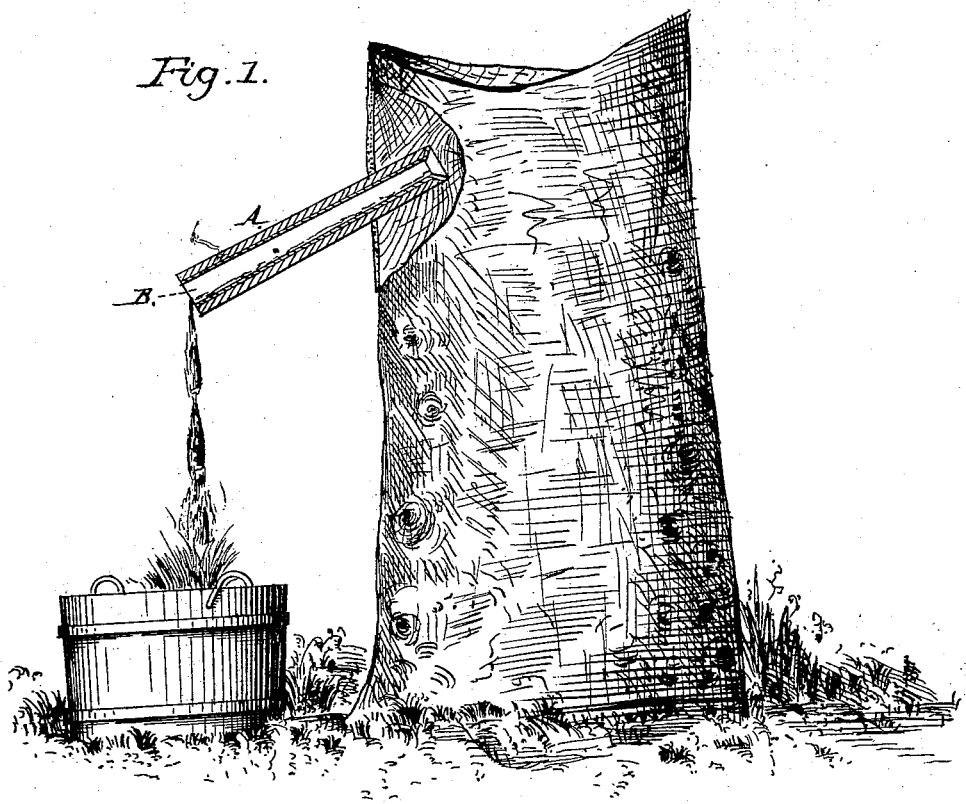
Figure 2:
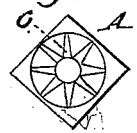
Figure 3:
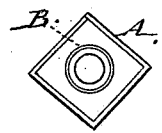

Figure 1 represents a longitudinal section of a sap-spout made according to my invention, showing also how it is applied to a tree. Fig. 2 is a view of that end of the spout which is inserted into the tree. Fig. 3 is a view of the larger end thereof.

Similar letters of reference indicate like parts.

This invention consists in a novel construction of spout for collecting saccharine sap from maple and other trees, being a combination of metal and wood, for the purpose of securing the advantages of both those materials without causing injury to the trees by bringing metallic surfaces in contact with them.

A designates the spout. It consists of a tube of wood lined within by a tube, B, of tin or other suitable metal. That part of the spout which enters the tree is of less diameter than the opposite end, both the wooden and metal tubes being gradually enlarged in diameter toward the discharging end of the spout. When metallic spouts are used to tap maple or other trees the trees seem to be injured and poisoned thereby, and the wounds made in tapping them are longer in healing than when wooden spouts are used.

By means of my invention I am enabled to preserve the advantages of the wooden spout and yet use a metallic conducting-tube, the only part of the spout which is in contact with the tree being the inclosing wooden tube. That end of the spout A which enters the tree is made after the manner of a countersink, and the end of the metallic tube at that part is cut into the form of rays C, which are bent outward against the sides of the countersink, as seen in Fig. 2. The receiving end of the spout is rounded, so as to fit tightly in the hole tapped in the tree, and the wooden tube at that end may be turned down to a smaller diameter than the rest of that tube, if desired. By enlarging the diameter of the spout toward its discharging end I secure a readier discharge of the sap through it, and one of the especial advantages thereby secured is that when the sap has been frozen in the spout it will slip out readily as soon as it has been thawed a little.

Having thus described my invention, I claim as new and desire to secure by Letters Patent—

A sap-spout made of an outer wooden tube inclosing a metallic tube, substantially as and for the purpose above described.

ARCHIBALD LEITCH.

Witnesses:
   H. S. HAZELTON,
   E. B. CLEMENT.